United States Patent

Correge et al.

[11] 4,421,646
[45] Dec. 20, 1983

[54] FILTERING DEVICE

[75] Inventors: Philippe Correge, Taverny; Lucien Gay, Chavenay, both of France

[73] Assignee: Societe Nationale Elf Aquitaine (Production), Paris, France

[21] Appl. No.: 43,225

[22] Filed: May 29, 1979

Related U.S. Application Data

[63] Continuation of Ser. No. 709,409, Jul. 28, 1976, abandoned, Ser. No. 832,479, Sep. 12, 1977, abandoned, and Ser. No. 925,325, Jul. 17, 1978, abandoned.

[51] Int. Cl.³ .............................................. B01D 29/10
[52] U.S. Cl. .................................... 210/291; 210/315; 210/461; 210/484; 210/487; 210/497.1; 166/231
[58] Field of Search ............... 210/315, 317, 335, 338, 210/263, 437, 291, 449, 460–463, 484, 487, 488, 497.01, 497.1; 29/163.5 CW, 163.5 F, 420, 420.5; 166/231, 232, 233, 236

[56] References Cited

U.S. PATENT DOCUMENTS

| | | | |
|---|---|---|---|
| 1,256,830 | 2/1918 | Rodrigo | 166/233 |
| 1,339,898 | 5/1920 | Layne | 166/232 |
| 3,312,349 | 4/1967 | Rosaen | 210/315 |
| 3,450,207 | 6/1969 | Hirsch | 166/236 |
| 3,816,894 | 6/1974 | Howard et al. | 29/163.5 |

*Primary Examiner*—Ernest G. Therkorn
*Attorney, Agent, or Firm*—Brisebois & Kruger

[57] ABSTRACT

The instant invention relates to an improved filtering device adapted to eliminate any risk of clogging of the filtering material. The invention provides a filtering device for treating any effluents, which comprises a plurality of filtering walls arranged successively between a chamber containing the effluent to be filtered and a chamber containing the filtered effluent, each filtering wall being constituted by spacedly justaposed strips having a trapezoidal section with the large base of the trapezoid located on the inlet face of the filtering wall, said strips being separated from each other, on the inlet face of the filtering wall, by intervals of equal widths forming slots which define effluent inlet areas, the sum of said inlet areas constituting the total inlet area of a filtering wall, and the total inlet area of the upstream wall being less than the total inlet area of the adjacent downstream wall.

4 Claims, 10 Drawing Figures

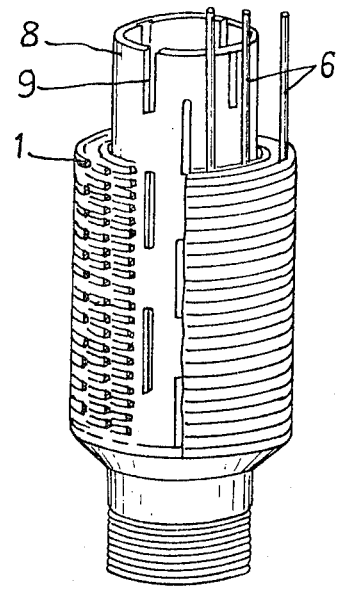
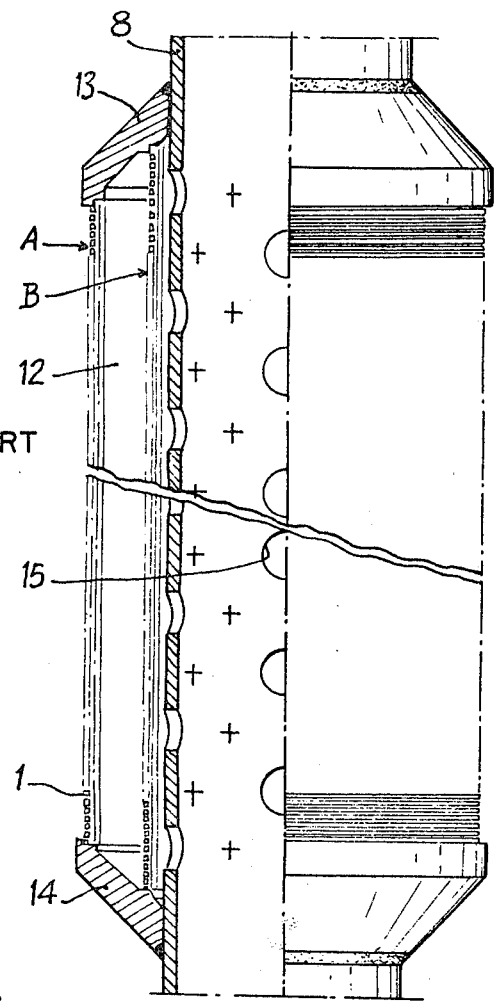
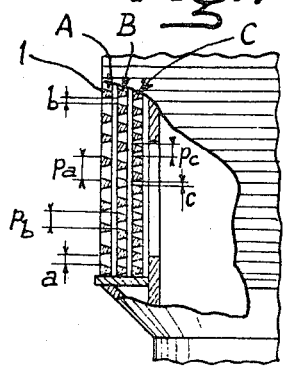
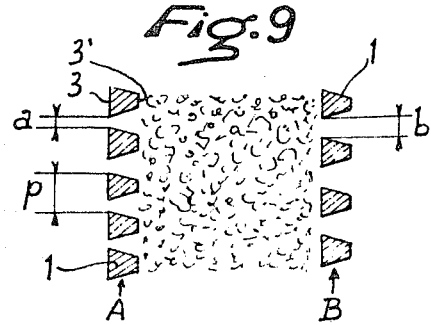

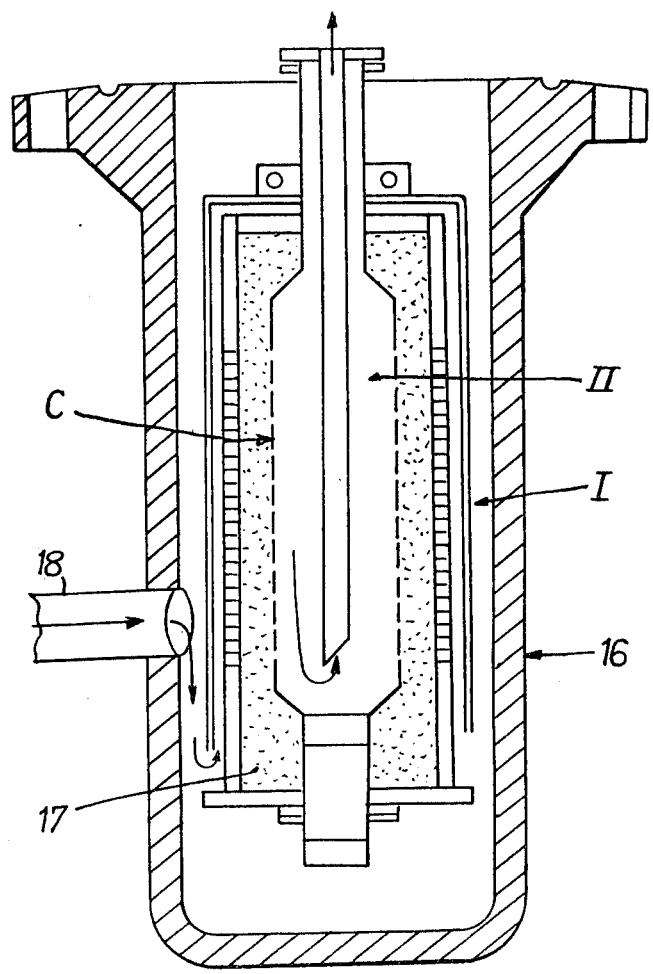

FILTERING DEVICE

This application is a continuation of prior copending applications Ser. Nos. 709,409, filed July 28, 1976; 832,479, filed Sept. 12, 1977; and 925,325, filed July 17, 1978, all of which are now abandoned.

The instant invention is related to an improved filtering device adapted to eliminate any risk of clogging of the filtering material and thus to ensure a long-time of the filtering device, especially in the case of strainers used in wells for extracting water or liquid or gaseous hydrocarbons.

Various types of strainers are known which are used in the chemical and food industries. However, the transposition or adaptation of these known strainers with a view to devising strainers adapted to be used in the field of extraction of water or oil from the subsoil has proved to be difficult, and has led to quite unsatisfactory results in practice.

A major problem encountered when defining the desired characteristics of a strainer adapted to prevent the introduction of nonconsolidated elements from the production layer in a well, and especially in the extracting conduits and the subsoil and surface installations has resided in the knowledge of the grain size of the productive layer. The determination of the grain size leads to the definition of the size of the passage orifices in the filtering wall portions.

It has soon been recognized that with a view to avoiding the clogging and thus to ensuring a long lifetime of a filtering installation, it was necessary to provide passage orifices in the form of slots having an elongated linear shape the length of which had to be relatively great as compared to their width. The desired width of said slots has been found to be a function of the supposed maximum size of the solid particles which are expected to be present in the most representative proportion in the matter to be extracted.

Several types of filtering elements constituted by a spiralshaped metallic strips wound around a cylindrical surface with a constant pitch have been devised. The pitch of the spiral is equal to the sum of the width of the strip and a constant distance representing the width of the slot.

With a view to avoiding the retention of solid particles and the sedimentation of solid matter in the slots, it has been proposed to use a metallic strip having a trapezoidal shape, in such a manner that the width of the strip is tapered in the direction of the flow of the matter to be extracted.

While the known strainers or filtering elements of this kind, having a single filtering wall, have allowed comparatively good results to be achieved, it has been observed that in the case of a slot for which too large dimensions had been selected as a result of an erroneous evaluation of the particle size, sand would be introduced into the well, resulting in clogging and interruption of the extraction operations; on the other hand, when the selected dimensions of the slot were too small, high flow velocities of the extracted matter would result in erosion and deterioration of the strainer.

With a view to obviating these drawbacks, it has been proposed to provide a plurality of concentrically arranged cylindrical filtering walls of one of the types described herein above. In these known devices, the width of the slots provided in each filtering wall was smaller than the width of the slots provided in the filtering wall surrounding the afore-mentioned filtering wall. This arrangement was bound to lead to a formation of deposits in accordance with a predetermined classification defined by the incremental differences between the respective widths of the slots provided in the successive filtering walls.

In practice it has been observed that, when using this latter type of strainer, an increasing flow velocity gradient through the entire strainer assembly will result in uncontrolled accumulation of solid matter in the intervals between the filtering walls, as well as in considerable pressure losses, which will result in rapid clogging.

The present invention is aimed at overcoming these drawbacks while allowing a satisfactory filtering effect to be obtained, by retaining the most representative fraction of particles, while preventing the particles which are allowed to pass from depositing, which allows a filtering device having a considerable life-time to be realized.

It is an object of the invention to provide a filtering device for treating any effluents, which comprises a plurality of filtering walls arranged successively between a chamber containing the effluent to be filtered and a chamber containing the filtered effluent, each filtering wall being constituted by spacedly juxtaposed strips having a trapezoidal section with the large basis of the trapezium located on the inlet face of the filtering wall, said strips being separated from each other, on the inlet face of the filtering wall, by intervals of equal widths forming slos which define effluent inlet areas, the sum of said inlet areas constituting the total inlet area of a filtering wall. In the device according to the invention the total inlet area of a filtering wall 1 to 50% smaller than the global inlet area of the adjacent wall is located downstream of the first-mentioned filtering wall, with reference to the direction of flow of the effluent. The interval separating any two adjacent filtering walls is filled with a packing permeable to fluids and inert with respect to the various constituents of the effluent to be treated.

In a preferred embodiment the packing provided in the interval between any two adjacent filtering walls is constituted by a material resisting to erosion and to compressive stresses; this material may be constituted, more particularly, by high-hardness glass balls having a minimum diameter larger than the width of slots of the inlet face of the filtering wall which is encountered in the second place by the effluent.

In an embodiment allowing the filtering process to be applied to a radial-circular drainage, each filtering wall is constituted by a strip having a trapezoidal section, said strip being wound around a cylindrical surface to form a spiral of constant pitch which is equal to the sum of the width of the large basis of the trapezoid plus a constant distance which represents the width of the slots.

The invention will be described herein below with reference to the appended drawings which are given by way of example, but not of limitation.

FIG. 6 shows a strainer having a plurality of filtering walls, constructed in accordance with the prior art.

FIG. 7 also shows a strainer comprising a plurality of filtering walls, according to the prior art.

FIG. 8 shows a strainer according to the present invention.

FIG. 9 shows a detail of the strainer according to the present invention.

FIG. 10 shows a testing device.

Figure 1:
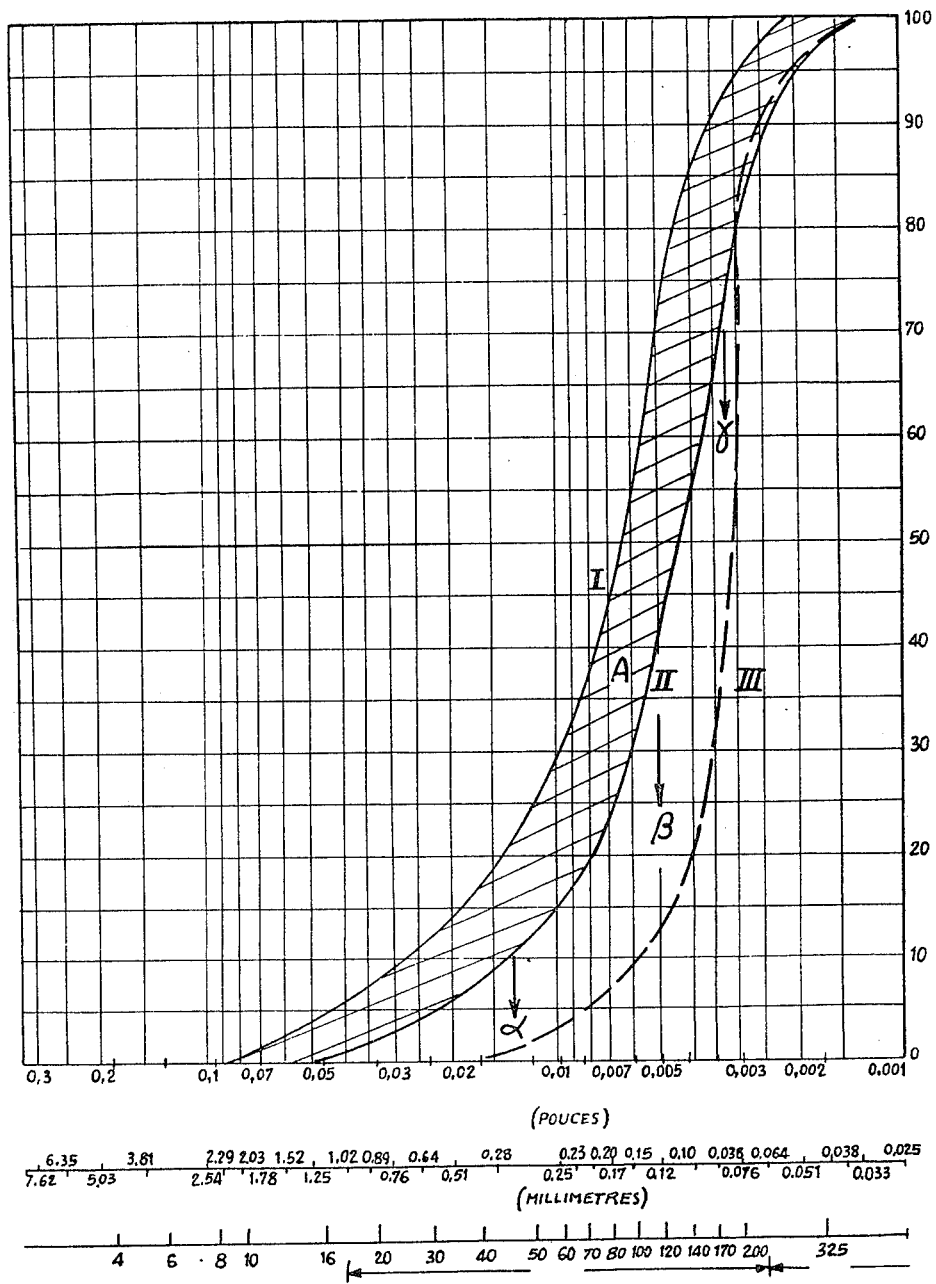
FIG. 1 is a graph showing the granulation characteristics of one type of sand present in a subsoil oil layer.

FIG. 1 is a graph representing the granulation characteristics of one type of sand present in a subsoil oil layer; this graph is meant to indicate the difficulty encountered when endeavoring to gather and use the relevant data. The ordinate indicates the cumulative percentages of retained matter, by weight, while the abscissa indicates the diameter of the particles.

Representative samples of the considered layer are not often available, as such samples could only be provided by continuous core-sampling.

The samples provided by lateral ball core-sampling have only a strictly local significance related to the particular site from which they originate, and even in the case of satisfactory sampling conditions, they have a very poor statistical value; thus these samples cannot be put to practical use. The various curves shown in the graph of FIG. 1 are located within the limits of a hatched zone A. This zone A is delimited by two curves each one of which provides an indication of the granulation characteristics of the subsoil layer. Curve I provides an optimistic indication, as according to this curve a maximum grain or particle size corresponds to a cumulated weight percentage, while curve II provides a pessimistic indication, as according to said curve II a minimum grain size corresponds to a cumulated weight percentage.

When an important amount of sand enters the wall, the granulation graph is defined by a curve such as curve III. This sand which is submitted to classification or grading has no representative value for the subsoil layer and cannot be used.

The pessimistic curve II will be used, in practice, for the determination of the widths of the slots provided in the filtering surfaces, as far as the knowledge of the materials which have led to the considered construction allows the operator to consider that this determination is not exaggeratedly pessimistic, as would be the case of curve III.

The characteristic values generally taken into consideration correspond to weight percentages of 10%, 40% and 70%, corresponding, in turn, to three particle diameter values alpha, beta, gamma, ($\alpha$, $\beta$, $\gamma$) respectively.

Figure 2:
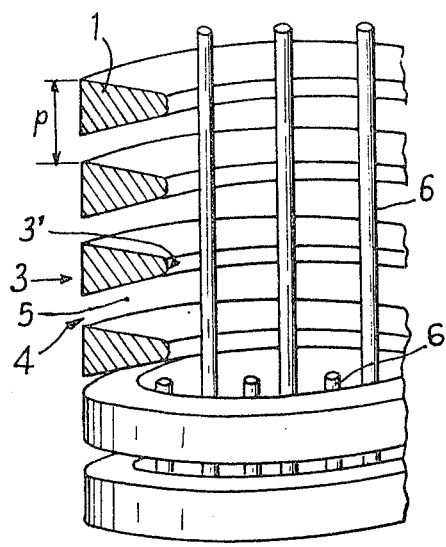
FIG. 2 shows a known spiral-shaped filtering wall.
Figure 3:
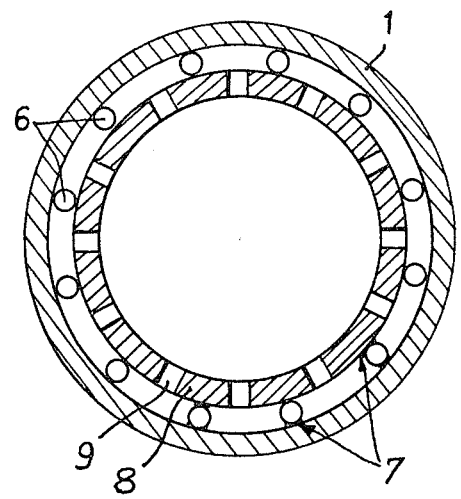
FIG. 3 is a sectional view of a spiral-shaped filtering wall.

FIGS. 2 and 3 show a strainer comprising a filtering wall constituted by a spiral-shaped strip 1 having a trapezoidal section and a constant pitch (p).

The trapezoidal section comprises a large basis 3 and a small basis 3'. The pitch corresponds to the sum of the width of the large basis 3 and the dimension (a) of the width of the linear slot 4.

The strip is oriented in such a manner that the larger basis of the trapezoidal section is located on the outer face of the filtering wall, which is the effluent inlet face. With reference to the flow direction of the effluent, the width of the strip is reduced progressively, while the width of the passage 5 defined between two sections of strip 1 increases correspondingly.

The strip rests on an assembly of parallel metallic rods constituting a cage, on which said strip is fixed by spot welding as indicated at 7. Thus the assembly has the desired rigidity.

An extraction tube 8 provided with filtering means in the form of longitudinal slots 9 is mounted within the strainer described with reference to FIG. 3.

Figure 4:
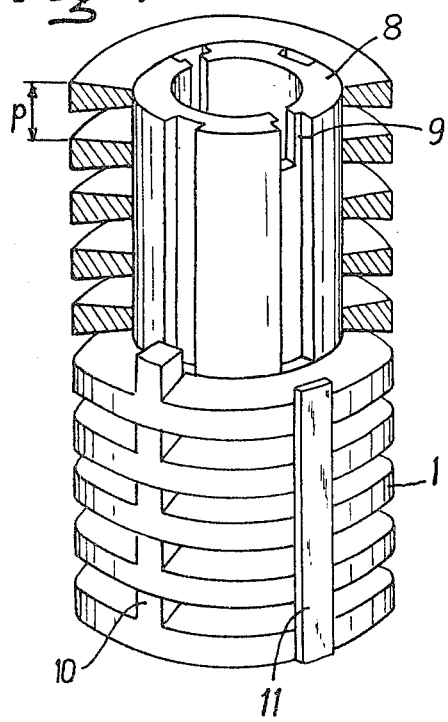
FIG. 4 shows another type of filtering wall according to the prior art.
Figure 5:
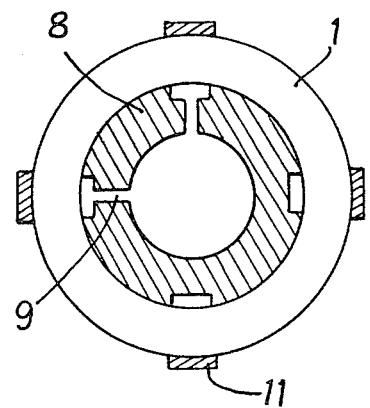
FIG. 5 is a sectional view showing yet another type of filtering wall.

FIGS. 4 and 5 show a strainer similar to the one previously described, but wherein strip 1 having a trapezoidal section comprises projections 10 regularly spaced over the length of strip 1. These projections 10 the thickness of which is equal to the width of the slots are provided with a view to maintaining the width of the associated slot at a constant value. A lateral welded strip 11 or a lateral welding bead consolidates the assembly. This embodiment also comprises an extraction tube 8 provided with filtering means in the form of longitudinal slots 9, said tube being arranged inside the strainer.

FIGS. 6 and 7 show a strainer comprising a plurality of concentrical filtering walls which belong to one of the types of strainer described herein above. The filtering wall shown in these Figures is the one described with reference to FIGS. 2 and 3. It will be seen that each filtering wall comprises a section 1 of a strip having a trapezoidal section and wound to form a spiral with a constant pitch. The trapezoidal section comprises a large basis and a small base. The pitch is equal to the sum of the width of the large base of said trapezoidal section and a constant distance. Said distance represents the width of a continuous linear slot the surface of which constitutes the inlet area of the effluent in the filtering wall.

The strainer shown in FIGS. 6 and 7 comprises three filtering walls A, B, C concentrically arranged in such a manner that the respective widths of the corresponding slots a, b, c have dimensions corresponding to the formula $a > b > c$.

Under these conditions the inlet areas A, B, C have respective values corresponding to the formula: Area $A >$ Area $B >$ Area C.

In FIGS. 6 and 7 the trapezoidal strips A, B and C wound up in the form of a spiral have identical sections; they may also have different sections as the conditions to be met concern the width of the slots, but not the dimensions of the large base or the small base of the trapezoidal section.

The annular intervals defined between the filtering walls A, B and C have respective widths on the order of the large dimension of the trapezoidal strips, and they are left free. Parallel metallic rods 6 are arranged in said intervals so as to form a cage, strip 1 being fixed onto said rods by spot-welding.

This is a structure comprising a plurality of filtering walls, as devised with a view to solving the problems encountered when using strainers having a single filtering wall. In fact, the device described with reference to FIGS. 6 and 7 has raised problems in practical use; in particular, rapid clogging has been observed in the case of most types of sand formations.

FIG. 8 shows a filtering device according to the present invention which may be used for filtering any effluents, and especially for filtering aqueous or liquid and gaseous hydrocarbon effluents in extraction operations.

The filtering device or strainer C comprises two cylindrical, symetrically arranged filtering walls A and B located between a chamber I containing the effluent to be filtered and a chamber II containing the filtered effluent. The left side of FIG. 8 shows the device in section; the filtering walls A and B can be seen in this part of FIG. 8. FIG. 9 shows a detail of the device of FIG. 8, also in section, but at a greater scale.

Each filtering wall is constituted by a strip having a trapezoidal section, which is wound up so as to form a spiral having a constant pitch (p). The trapezoidal section comprises a large base 3 and a small basis 3'; the pitch (p) is the sum of the width of the large base 3 of the trapezoidal section and the dimension (a) of the width of a linear slot 4. Strip 1 is oriented in such a manner that the large base 3 of the trapezoidal section is located on the outer periphery of the filtering wall, said outer periphery constituting the inlet face for the effluent. With reference to the direction of flow of the effluent, the width of the strip decreases and the width of the passage defined between two adjacent sections of strip 1 increases correspondingly.

Strip 1 rests on an assembly of metallic rods 6 forming a cage, onto which said strip is fixed by spot welding.

It will be understood that each filtering wall A and B is of the type described herein above with reference to FIG. 2.

The two filtering walls A and B are constituted by strips having a trapezoidal section and identical characteristics, but which might be different; indeed the filtering walls are characterized by the total filtering area which is the product, for each filtering wall, of the width of the slot (i.e.(a) for filtering wall A and (b) for filtering wall B) and the length of the slot, the arrangement being such that the total filtering area of B is 1 to 50% larger (in the particular case shown in FIGS. 8 and 9, 30% larger) than the total filtering area of A.

The two filtering walls A and B are separated from each other by an annular interval 12 the width of which is high as compared to the thickness of walls A and B; in the example shown in FIGS. 8 and 9, the width of said interval is equal to six times the said wall thickness. The annular interval 12 is filled with a packing permeable to fluids and inert with respect to the various constituents of the effluent to be treated. In the embodiment shown in FIGS. 8 and 9, said material is constituted by hard glass balls the minimum diameter is larger is larger than the width of the slots of the inlet face of the filtering wall encountered in the second place by the effluent, i.e. wall B.

The annular interval thus filled with a permeable packing has a regulating function and acts, in a way, as a tranquilizing element for the effluent flow.

The assembly constituted by the two concentrical cylindrical walls A and B is fixed, at the ends of said walls, to two annular flanges 13, 14 which are fixed in turn to an extraction tube 8 provided with filtering means in the form of regularly spaced orifices 15 facing the filtering walls.

In one embodiment of strainer C, the filtering walls A and B are made of spiral-shaped strips defining a continuous slot having a width of 0.30 mm for wall A and 0.63 mm for wall B, thus defining global filtering areas of 695 cm² for A and 910 cm² for B, the entire assembly being mounted on a tube having a diameter of 115 mm and provided with regularly spaced orifices having a diameter of 20 mm. The annular interval is filled with balls made of high-strength glass having a diameter of 1.50 to 1.70 mm.

As shown in FIG. 10, strainer C is mounted within a pressure lock-chamber 16 containing a sand packing 17 having a selected grain size which corresponds substantially to the granulation characteristics indicated by curve II in the graph of FIG. 1.

A three-phase effluent 18 containing water, gas and gasoline and having a temperature of 60° C. and a pressure of 90 bars has been circulated through the sand packing and the filtering device C, during several test runs.

The amounts of sand recovered downstream of the strainer was very low; the cumulated values of the sand thus recovered were:

10 cm³ after 6 days testing
60 cm³ after 12 days testing
410 cm³ after 88 days testing and the passing of about 8,000,000 Nm³ gas, which corresponds to about 100,000 m³ under the actual testing conditions.

The strainer or filtering device according to the invention, for filtering water, hydrocarbons or steam in industrial applications are particularly reliable, safe and economically advantageous in operation.

What is claimed is:

1. A filtering device comprising a plurality of filtering walls arranged successively between a chamber containing the effluent to be filtered and a chamber containing the filtered effluent, each filtering wall constituted by spaced juxtaposed strips having a trapezoidal section with a large base located in the inlet face of the filtering wall, said strips being separated from each other, at said inlet face, by slots of equal widths which constitute the inlet areas for the effluent to be filtered, the sum of said areas representing the total inlet area of the filtering wall, said total inlet area of the filtering wall being 1 to 50% smaller than the total inlet area of an adjacent filtering wall located downstream of the first-mentioned filtering wall with reference to the direction of flow of the effluent, and the width of the slots of a filtering wall being less than the width of the slots of an adjacent downstream filtering wall, the interval separating any two adjacent filtering walls being filled with a packing material permeable to fluids and inert with respect to the various constituents of the effluent, said packing material being constituted by a material resistant to erosion and compressive stresses, said material being hard glass balls the minimum diameter of which are larger than the width of the inlet slots of the filtering wall encountered by the effluent, each filtering wall being constituted by a strip having a trapezoidal section and wound up around a cylindrical surface so as to form a spiral having a constant pitch which is equal to the sum of the width of the large base of said trapezoidal section and a constant distance defining the width of said slots.

2. A filtering apparatus comprising at least two cylindrical concentric filtering elements defining between them an annular interval, each filtering element being a spiral-shaped strip having a trapezoidal cross-section, the longer base of which is located on the outer face of the filtering element so that the width of the slots defined between two sections of the strip increases from outside the filtering element to inside the filtering element, and the width of the slots of an outer filtering element being smaller than the width of the slots of each inner filtering element and wherein the total inlet area of each filtering wall is 1 to 50% smaller than the total inlet area of the adjacent filtering wall located downstream thereof, said annular interval being filled with a material permeable to fluids in the effluent to be treated and inert to the other constituents thereof.

3. A filtering device according to claim 2, wherein each filtering wall is constituted by a strip wound up in a cylindrical locus so as to form a spiral having a constant pitch which is equal to the sum of the width of the large base of said trapezoidal section and a constant distance defining the width of said intervals.

4. A filter comprising at least two cylindrically-shaped filter elements, said elements being arranged concentrically one within the other to form an inner element and an outer element, said elements being spaced one from the other to define therebetween an annular chamber bounded by said inner element and said outer element, each element being a spirally wrapped strip with slots between the strips, each strip having a trapezoidal cross-section with the longest base side of the trapezoid being located at the exterior of the element, the width of the slots in the inner element being about 30–50% greater than the width between the slots in the outer element, said annular chamber being filled with hard glass balls having a minimum diameter greater than the width of the slots in the inner element, the width of the annular chamber being at least six times the thickness of the walls of the inner and outer elements.

* * * * *